United States Patent
Chen et al.

(10) Patent No.: US 12,205,149 B1
(45) Date of Patent: Jan. 21, 2025

(54) ADVERTISEMENT EXCHANGE PLATFORM OPERATING INSTANTANEOUS AUCTIONS OF DIFFERENT TYPES FOR IMPRESSION ALLOCATION

(71) Applicant: OpenX Technologies, Inc., Pasadena, CA (US)

(72) Inventors: Jeddy Chang Chen, Pasadena, CA (US); Qasim Saifee, Tarzana, CA (US); Ronald Shin-Yung Taur, Pasadena, CA (US); Ian Davidson, Santa Monica, CA (US)

(73) Assignee: OpenX Technologies, Inc., Pasadena, CA (US)

( * ) Notice: Subject to any disclaimer, the term of this patent is extended or adjusted under 35 U.S.C. 154(b) by 669 days.

(21) Appl. No.: 15/429,029

(22) Filed: Feb. 9, 2017

Related U.S. Application Data

(60) Provisional application No. 62/293,196, filed on Feb. 9, 2016.

(51) Int. Cl.
  *G06Q 30/0273*  (2023.01)
  *G06Q 30/0241*  (2023.01)

(52) U.S. Cl.
  CPC ..... *G06Q 30/0275* (2013.01); *G06Q 30/0277* (2013.01)

(58) Field of Classification Search
  CPC . G06Q 30/02; G06Q 30/0275; G06Q 30/0277
  See application file for complete search history.

(56) References Cited

U.S. PATENT DOCUMENTS

| | | | | |
|---|---|---|---|---|
| 2010/0114716 | A1* | 5/2010 | Heilig | G06Q 30/08 705/14.71 |
| 2012/0030034 | A1* | 2/2012 | Knapp | G06Q 30/0275 705/14.71 |
| 2012/0303462 | A1* | 11/2012 | Mysen | G06Q 30/02 705/14.71 |

(Continued)

OTHER PUBLICATIONS

Zhu et al., "Hybrid Advertising Auctions," Marketing Science, vol. 30, No. 2, pp. 249-273, 2011 (Year: 2011).*

(Continued)

*Primary Examiner* — Resha Desai
*Assistant Examiner* — Patrick Kim
(74) *Attorney, Agent, or Firm* — Patent Law Works LLP

(57) ABSTRACT

An improved advertisement-exchange platform configured to operate in a dynamic, online environment, and execute instantaneous auctions of different types, e.g. first and second price auctions, to determine and price advertisement impression allocations effectively and automatically in real time on an impression-by-impression basis. In accordance with one embodiment, the advertisement-exchange platform operates separate first and second price auctions and compares the results of both to select the highest bid price and associated impression instantaneously for ad placement. In accordance with yet another embodiment, the improved advertisement-exchange platform operates combined first and second price auctions and if the highest bid is from a second price bid, the winning Demand-Side Platform pays the second highest bid (which may be the first price bid) and if the highest bid is from a first price bid, the winning Demand-Side Platform pays this bid.

10 Claims, 7 Drawing Sheets

(56) References Cited

U.S. PATENT DOCUMENTS

| | | | |
|---|---|---|---|
| 2013/0097028 A1* | 4/2013 | Han | G06Q 30/02 |
| | | | 705/14.71 |
| 2014/0006170 A1* | 1/2014 | Collette | G06Q 30/0277 |
| | | | 705/14.71 |
| 2014/0095324 A1* | 4/2014 | Cabral | G06Q 30/08 |
| | | | 705/14.71 |
| 2016/0371747 A1* | 12/2016 | Lidow | G06Q 30/0275 |
| 2017/0098252 A1* | 4/2017 | Box | G06Q 30/08 |

OTHER PUBLICATIONS

Yuan et al., "A survey on real time bidding advertising," Proceedings of 2014 IEEE International Conference on Service Operations and Logistics, and Informatics, pp. 418-423, 2014 (Year: 2014).*

Koh, "Keyword auctions with budget-constrained bidders." Review of Economic Design 17 (2013): 307-321 (Year: 2013).*

* cited by examiner

ADVERTISEMENT EXCHANGE PLATFORM OPERATING INSTANTANEOUS AUCTIONS OF DIFFERENT TYPES FOR IMPRESSION ALLOCATION

CROSS REFERENCE TO RELATED APPLICATIONS

This application claims priority under 35 USC § 119 (e) to provisional U.S. Application Ser. No. 62/293,196, entitled "Advertisement Exchange Platform Operating First and Second Price Auctions for Determining and Pricing Advertisement Impression Allocation" filed on Feb. 9, 2016, the entirety of which application is herein incorporated by reference.

BACKGROUND

1. Field of the Invention

The present invention relates generally to the field of digital display advertising. In particular, the present invention relates to an improved advertisement-exchange platform configured to operate in a dynamic, online environment, and to execute instantaneous auctions of different types (e.g., first and second price auctions) for determining, pricing and selecting advertisement impression allocations effectively and automatically in real time for rendering in empty or vacant ad slots (the area on a web page designated for the display of advertising) designated within online content.

2. Description of the Related Art

In the online advertising landscape, information is often transferred between an ad server and a user's web browser instantaneously. The primary transaction is referred to as an ad request, which is composed of two parts: (1) the request, where a message containing information relevant for ad or impression selection is composed and sent to the ad server and (2) the response, where the ad server returns the selected ads or impressions back to the client device for display.

Ad requests are typically initiated or informed by a snippet of HTML on a web page called an ad tag. An ad request refers to a communication between a web browser or application and an ad server to display an ad. The contents of an ad tag may include placeholder elements, fallback images, and scripts that trigger ad requests or the like. An ad tag script will often call into a local JavaScript file, referred to here as a tag library. The tag library is essentially responsible for constructing and issuing ad requests, handling ad responses, and displaying returned ads.

A returned ad is often in the form of an arbitrary string of HTML called a creative. The tag library displays the ad by adding the creative to the current web page in the appropriate location. In the simplest case, the creative contains an image or Flash element representing what is ultimately visible to the user as the ad, but the creative can also represent the HTML for a third-party ad tag. The method presented in this document is particular to when an ad server returns third-party tags. When third-party tags are added to the page, the entire ad request process is repeated under the control of the third party.

When a creative is added to the web page, a notification called an impression is sent back to the ad server to confirm that the ad has been displayed. The term impression also generally refers to the event of a user viewing a slot into which an ad can be served, along with any contextual information that could inform the ad selection process. In this sense, impressions are what advertisers are ultimately interested in purchasing from web publishers.

At the Ad Supply (from inventory) end of the online advertising landscape, digital advertising supply, or inventory, refers to the impressions that website publishers have made available for advertisers to purchase. Impressions are eventually associated with ad units, the physical spaces on web pages reserved for displaying ads. At a high level, inventory has traditionally been categorized into two groups:

1. Premium inventory refers to impressions that are sold directly to advertisers who have guaranteed to pay a fixed price for a certain quantity. These may be associated with ad units that can be viewed without user scrolling, or of spaces that exist on pages with heavy traffic. While typically a smaller percentage of all inventory, premium inventory is more valuable to advertisers because of its higher exposure to users.

2. Remnant inventory refers to the leftover impressions that have not been directly sold. These may be associated with less visible, lower traffic ad units that are naturally less valuable to advertisers because of their lower exposure to users. Because the amount of remnant inventory is typically much greater than that of premium inventory, much of it often goes unsold.

Companies called ad networks have historically found a niche aggregating remnant inventory and matching it with advertiser demand. Ad networks provide publishers with ad tags that can be incorporated into their web pages as described above. Such tags are associated with different compensation methods depending on the type of inventory targeted. For remnant inventory, the most common method is Cost Per Mille, or CPM, which is the price the ad network agrees to pay for every 1,000 impressions an ad receives. Ad network tags often have the possibility of not finding a suitable ad for a given impression. In this case, it is possible for the ad network to return a predetermined value in place of an advertisement. This value is provided by the end user when requesting a tag from the ad network, and may be HTML, JavaScript, or another ad tag. The ability to return this predetermined value when an ad cannot be found defines a defaulting tag. If no default value has been configured, no ad is shown in the ad unit slot, but this is acceptable behavior because of the lower priority of filling remnant inventory. Defaulting ad tags are different from fill-all tags, which guarantee to serve an ad, but often at a much lower CPM. Fill-all tags are often used as the default value for defaulting tags.

Mechanisms and schemes that efficiently, automatically, and effectively determine pricing and select and serve ads continue to be desirable in the online advertising industry.

SUMMARY

The present invention overcomes the deficiencies and limitations of prior systems and methods in the online digital advertising environment, at least in part by, providing system architecture and methods that are configured into an improved advertisement-exchange platform, which is configured to dynamically and instantaneously (e.g., execution of operations occurring within 0 and 100 milliseconds of each other) determine pricing and impression allocation for ad placement in a dynamic online environment, on an impression-by-impression basis, by conducting instantaneous auctions of different types, e.g. first and second price auctions, either separately or combined. This programmaticad-exchange platform advantageously presents scenarios in which bid requests and responses compete in the same dynamic, online environment to increase automated competitive bidding operations and improve fair, effective, and automated pricing with impression allocation and placement in publisher content provided for viewing by consumers. The improved programmatic ad-exchange platform has improved selection, matching, and pricing algorithms configured to inject more bids for consideration by the ad-exchange, providing buyers greater control over pricing, which is an advantage for bidder publishers.

In accordance with some embodiments, an improved advertisement-exchange platform is configured to operate in a dynamic, online environment, and execute instantaneous, first and second price auctions to determine and price advertisement impression allocations effectively and automatically, in real time, on an impression-by-impression basis.

In accordance with one embodiment, the advertisement-exchange platform operates separate first and second price auctions and compares the results of both to select the highest bid price and associated impression instantaneously for ad placement.

In accordance with yet another embodiment, the improved advertisement-exchange platform operates combined first and second price auctions and if the highest bid is from a second price bid, the winning Demand-Side Platform pays the second highest bid (may be the first price bid) and if the highest bid is from a first price bid, the winning Demand-Side Platform pays this bid.

In accordance with yet another embodiment, an improved method is implemented by an ad-exchange platform, connected by a network, within an architecture of advertiser and publisher servers and a plurality of client devices, for instantaneous selection and placement of advertisements on a web page displayed on the client devices, the method comprising operations including, 1) receiving a bid request for one or more advertisements from a publisher server, by a processor, from a browser on a client device on which the web page is displayed with a vacant or empty ad slot; 2) transmitting the advertisement bid request, by the processor, to a plurality of demand partner platforms coupled to the ad-exchange platform and within the networked architecture of servers, to solicit bid responses from different auction types, e.g. a first-price bid response and a second-price bid response from each of the plurality of demand partner platforms for placement of particular advertisement inventory within the vacant or empty ad slot; 3) executing instantaneously the different auction types, e.g. first-price and second-price auction types, by the processor, to determine at least one particular advertisement for placement in the empty or vacant ad slot, including executing a first-price auction with first-price bids and executing a second price auction with second-price bids; 4) when running the first and second price auction types, selecting the highest bid as the winning bid of the first-price auction and designating and selecting the highest bid as the winner of the second-price auction, and designating a clearing price as the highest bid in the first-price auction and the clearing price as the second-highest bid in the second-price auction; 5) comparing the highest bid and the second highest bid and designating the higher the winning bid; 6) receiving, by the network, a particular advertisement associated with the winning bid from the advertisement server; and 7) rendering, by the processor, the particular advertisement within the ad slot on the web page. In addition, in some embodiments, the method includes operations for executing the different auction types, e.g. first-price and second-price auction types, as separate operation flows that are initiated at the same time to produce an outcome identifying a winning impression for an inventory of impressions to be merged into the advertisement slot. In accordance with other embodiments, the method includes operations for executing the different auction types, e.g. first-price and second-price auctions as a combined operation flow to select the impression for the advertisement slot.

In accordance with other features implemented in the ad-exchange platform, the bid request includes a designation identifying an auction type e.g. at least one of the first-price auction and a second-type auction for determining a select impression from an inventory of impressions for the advertisement slot.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The present invention is illustrated by way of example, and not by way of limitation in the figure of the accompanying drawing in which like reference numerals are used to refer to the same or similar elements.

Figure 1:
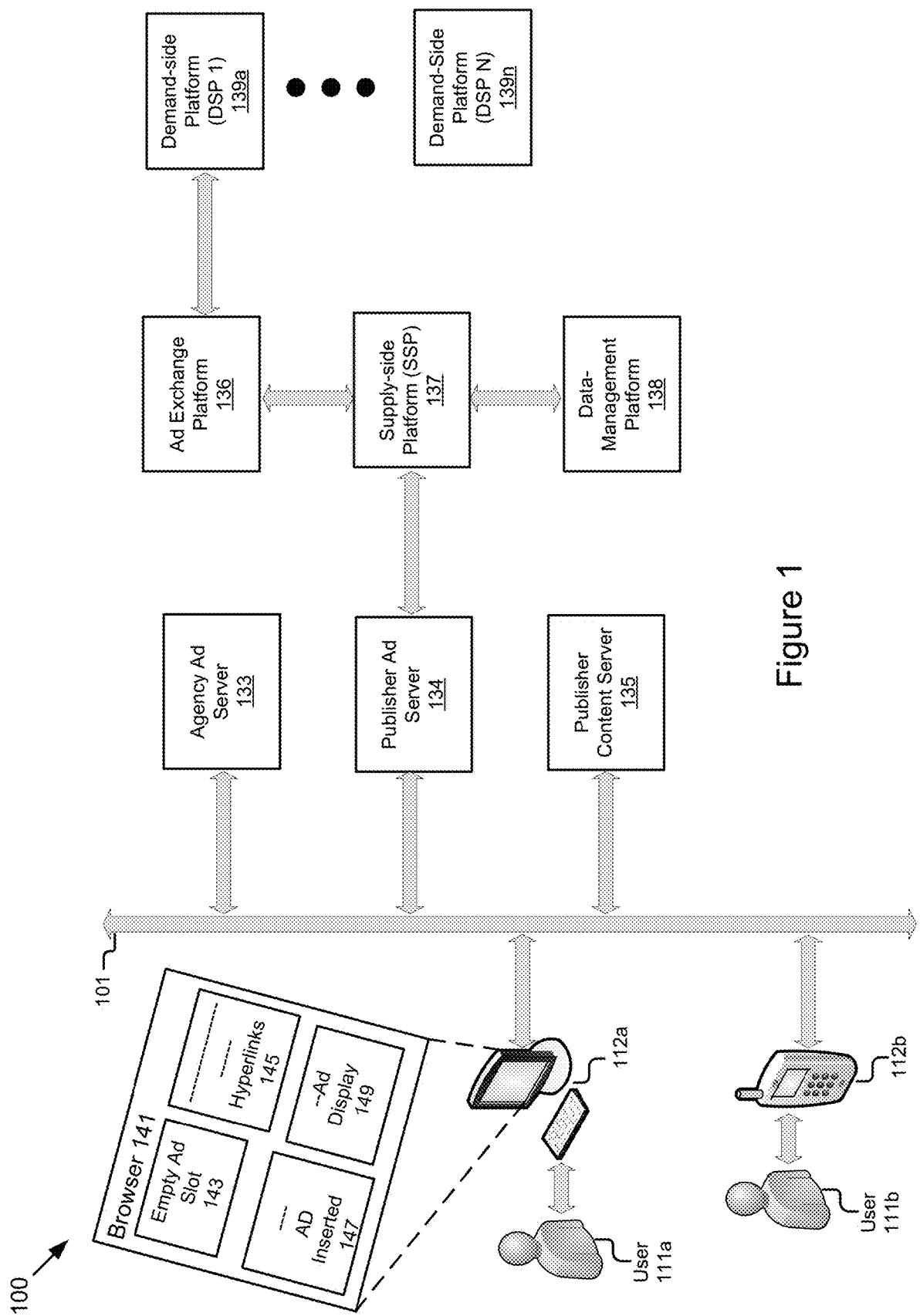
FIG. 1 is high-level block diagram illustrating an example improved programmatic-exchange platform in a dynamic, online digital advertising display environment, by which impression allocations are priced and determined by first and second price auctions instantaneously conducted, executed either separately or combined.

The above-described figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An example advertising technology exchange platform is configured to facilitate buying and selling in real-time of media advertising inventory from multiple ad entities and/or networks, by which pricing for advertising inventory is determined by instantaneous online bidding operations and impressions are selected for placement in publisher content. The term instantaneous is used in this application to mean instantaneous from an execution perspective, where execution of operations occurring within 0 and 100 milliseconds of each other would be considered as instantaneous. In accordance with the invention, an improved advertisement-exchange platform configured to execute millions of transactions, on an impression-by-impression basis uses improved bidding operations, including determining pricing for advertising inventory (impression allocations) by conducting multiple auction types simultaneously or otherwise, for example, first and second price auctions, either separately or combined, to select particular impressions for placement. By this technology, an example bid request is received from the advertising technology exchange platform, which is a real-time technical platform by which advertising inventory may be bought and sold on a per-impression basis, via programmatic instantaneous auctions. With real-time bidding, advertising buyers bid on an impression for placement in an advertisement slot in online content, and if the bid wins, the buyer's advertisement is instantly displayed on the publisher's site. By real-time bidding advertisers manage and optimize advertisements from multiple ad-networks by granting a user access to a multitude of different networks, allowing them to create and launch advertising campaigns, prioritize networks, and allocate inventory.

It should be recognized that any reference to advertising here includes all types of advertising, including banner ads (including rich media banners), to advertising placed by search engine optimization, social networking, etc.

In the following description, for purposes of explanation, numerous specific details are set forth in order to provide a thorough understanding of this technology. It will be apparent, however, that this technology can be practiced without some of these specific details. In other instances, structures and devices are shown in block diagram form in order to avoid obscuring the innovative aspects. For example, the present technology is described by an example implementation below with reference to particular hardware and software.

Reference in the specification to "one implementation or embodiment" or "an implementation or embodiment" simply means that a particular feature, structure, or characteristic described in connection with the implementation or embodiment is included in at least one implementation or embodiment of the technology described. The appearances of the phrase "in one implementation or embodiment" in various places in the specification are not necessarily all referring to the same implementation or embodiment.

Some portions of the detailed descriptions that follow are presented in terms of algorithms and symbolic representations of operations on data bits within a computer memory. These algorithmic descriptions and representations are the means used by those knowledgeable in the data processing arts to most effectively convey the substance of their work to others in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description here, any discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present technology also relates to an apparatus or system for performing the operations described. This apparatus may be specially constructed for the required purposes, or it may comprise a general-purpose computer selectively activated or reconfigured by a computer program stored in the computer to thereby create a special-purpose computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMS, EEPROMs, magnetic or optical cards, flash memories including USB keys with non-volatile memory or any type of media suitable for storing electronic instructions, each coupled to a computer system bus.

The present technology can take the form of an entirely hardware embodiment, an entirely software embodiment or an implementation containing both hardware and software elements. In some implementations, this technology is implemented in software, which includes but is not limited to, firmware, resident software, microcode, etc.

Furthermore, this technology can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

It should be recognized that a data-processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times, code must be retrieved from bulk storage during execution.

Input/output or I/O devices (including but not limited to, keyboards, displays, pointing devices, etc.) can be coupled to the system either directly or through intervening I/O controllers.

Network adapters may also be coupled to the apparatus or system to enable the data-processing system to become coupled to other data-processing systems or remote printers or storage devices through intervening private or public networks. Modems, cable modem, and Ethernet cards are just a few of the currently available types of network adapters.

Finally, the algorithms and displays presented here are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the invention as described herein.

1. System Overview

FIG. 1 illustrates a block diagram of an example online and dynamic digital advertising pricing and display environment 100, in which advertisers use the Internet (accessible over bus 101) to deliver marketing messages to consumers (e.g., users 111a and 111b). In this environment, a particular user 111a or 111b, by a computer 112a (e.g. desktop computer) or a mobile (cellular) device 112b accesses content (displayed on the computer screen) by a browser for viewing.

The particular user (alternatively referred to as a consumer, client, or viewer) device is representative of client devices and is a conventional type of computing device, for example, a personal computer, a hardware server, a laptop computer, a tablet computer, or smart phone. The client devices (112a and 112b) are illustrated, as coupled to the network (along bus 101). In one embodiment, the client device 112a is coupled to receive online advertisements from an advertisement server directly and/or receive content from publishing sites such as the publisher server via the network. The client device 112a includes a web browser for presenting online content and advertisements to a user. The web browser is configured to provide access to a hosted web page. The web page may comprise a main area in which content is displayed and an advertisement. In some instances, the advertisement may be contained within an iframe.

The technology and process by which online advertising is displayed in the content (see projected block with browser 141 and four ad slots) that the user 111a or 111b is viewing involves many technology platforms, which engage in server-to-server interactions. Instead of an ad slot, ad zones may also be designated in online content to represent a location on the web page where creative should be displayed. Of the four ad slots that are illustrated in the content, the first is designated as an empty or vacant ad slot 143, which represents the empty spaces in online content that need to be filled with advertising. The second ad slot 145 with a horizontal line illustrates hyperlinks used in web page advertising to obtain advertising from inventory stored elsewhere. The third ad slot illustrates an ad that is inserted 147 (placement of a select ad in the empty ad slot). And, the fourth ad slot illustrates an ad display 149 once it is properly inserted or merged into the ad space or slot.

It should be recognized that the bus/network 101 (in the online environment) is a conventional type, wired or wireless, and may have any number of configurations such as a star configuration, token ring configuration or other configurations known to those skilled in the art. Furthermore, the network 101 may comprise a local area network (LAN), a wide area network (WAN) (e.g., the Internet), and/or any other interconnected data path across which multiple devices may communicate. In yet another embodiment, the network 101 may be a peer-to-peer network. The network 101 may also be coupled to or includes portions of a telecommunications network for sending data in a variety of different communication protocols. In yet another embodiment, the network 101 includes Bluetooth communication networks or a cellular communications network for sending and receiving data such as via short messaging service (SMS), multimedia messaging service (MMS), hypertext transfer protocol (HTTP), direct data connection, WAP, email, etc. The exchange platform is coupled by signal line to an advertisement server, which serves ads. The advertisement server is software that receives requests for ad units, submits, and then fulfills those requests with online content. The advertisement server is coupled to the network for communication and interaction with advertiser server and/or the publisher server. In some embodiments, the advertisement server is also coupled to interact directly with the user devices as depicted in FIG. 1.

In some embodiments, a website publisher may select and serve the ads, as illustrated by publisher-ad server 134. In some embodiments, the ads may be outsourced to an ad agency under contract with the publisher, and served from the agency's servers, as illustrated by the agency-ad server 133. Alternatively, in some embodiments, an ad space within content may be offered for sale in a bidding market using an ad-exchange platform 136 and real-time bidding (RTB) operations either integrated into the ad-exchange platform 136 or accessed through the ad-exchange platform 136. This involves many platforms interacting automatically in real-time.

In response to a request from the user's browser (via computer 112a or mobile device 112b), the publisher content server 135 sends the web page content (as displayed on the computer screen of computer 112a) to the user's browser over the Internet (accessed by bus 101). This webpage is devoid of ads, but contains the links, which cause the user's browser to connect to the publisher ad server 135 to request that the spaces left for ads (or vacant or empty ad slots) be filled in with advertisements. Information identifying the user 111a or 111b, such as cookies and the web page being viewed (with content displayed) is transmitted to the publisher ad server 134. The publisher ad server 134 then communicates with a supply-side platform server (SSP) 137. The publisher content server 135 offers ad space for online sale, so it is considered the supplier. The supply-side platform 137 also receives the user's identifying information, which is transmitted to the data management platform 138. At the data management platform 138, the user's identifying information is used to look up demographic information, previous purchases, and other information of interest to advertisers. The data management platform 138 may maintain different types of data. For example, the data-management platform 138 may maintain first-party data retrieved from CRM (customer relationship management) platforms, in addition to, website and paid media content or cross-platform data. This may include data from customer behaviors, actions, or interests. The data-management platform 138 may include second-party data including a compilation of cookie pools on external publications and platforms. This data may be provided directly from the source (ad servers, hosted solutions for social or an analytics platform). A particular publisher may also provide secure and specific data points or audiences. Another type of data may be third-party data that is sourced from external providers and numerous websites. All this customer information is combined and provided to the supply-side platform 137, which may use this type of data to create an offer of an ad space along with information about the user who will ultimately use it. The supply-side platform 138 sends the offer to an ad-exchange platform 136.

The ad server 134 represents a complete digital advertising platform that allows publishers to sell, manage, and deliver their advertising inventory across all digital formats and screens. The ad server 134 is configured for cloud-based processing and provides publishers with the ability to view their advertising models from every angle before starting an advertising campaign. The ad server's (134) fully configurable, decision engine matches every impression with the right ad to deliver according to a publisher's revenue goals. It provides this across direct, RTB, and network demand on one unified platform. The ad server 134 may be integrated to the ad-exchange platform 136. An open Application Programming Interface (API) allows for direct, easy integration with existing internal systems and third-party platforms. The ad server 134 provides an intuitive user experience to facilitate unique needs and processes. The ad server 134 provides a seamless advertising experience with its ability to tailor ads across all screens and formats, making them compliment the content.

The ad-exchange platform transmits the offer for bidding to demand-side platforms (DSP1 through DSPN). The demand-side platform 139a through demand-side platform 139n, represent any number of demand-side platforms that may typically act on behalf of ad agencies, by the agency-ad server 133 that sells ads which advertise brands. Demand-side platforms 139a-139n have ads ready to display and search for users to view them. Bidders obtain the information on the user (111a-111b) about to view the ad, and decide, based on that information, how much to offer to buy the ad space. The demand-side platform 139a (or any of 139n) typically has about 100 milliseconds to respond to an offer. The ad-exchange platform selects the winning bid and informs both parties. The ad-exchange platform 136 passes the link to the ad back through the supply-side platform 137 and the publisher's ad server 134 to the user's browser (e.g., on computer 112a), which then requests the ad content from the agency's ad server 133. The ad agency then confirms that the ad was delivered to the user's browser (for display on the computer screen 112a).

Mobile advertising involving ad copy delivery through wireless mobile devices 112b, such as smartphones, feature phones, or tablet computers, represent static or rich media display ads, SMS (short message service) ads, or MMS (multimedia messaging service) ads, mobile search ads, advertising within mobile websites, or ads within mobile application or games.

The ad-exchange platform 136 is a large programmatic digital advertising exchange (online marketplace) that offers dynamic access to independently-rated inventory, by pairing premium buyers with high-quality ad inventory, in instantaneous transactions online. With programmatic ad-exchange platforms, efficient matching algorithms benefits both buyers and sellers and provides relevant ads for the end user, all within milliseconds, billions of times every day. This provides advertisers with full visibility into all the available premium-advertising inventory and access to buy select advertising from the inventory at the fairest price. The ad-exchange platform 136 is scaled to a level that allows advertisers to reach target audiences through a vast selection of inventory across publisher sites, mobile applications, consumer devices, and ad formats, across all formats and all screens. The ad-exchange platform 136 is configured to either provide access to a target audience, by real-time bidding and a fixed bid (a contractual agreement to provide specific software services for a specified price or price range), or through preferred deals created and private auctions, or automated purchase, without real-time bidding that is tag-based. The Uniform Resource Locators (URLs) are configured to be transparent to provide full visibility into where the ads will ultimately appear, revealing even the domain level, before a purchase transaction is actually effected.

For those publishers with a large application portfolio, a server-to-server integration layer provides a scalable solution that avoids fragmentation and increased ease of use across different application versions, multiple SDK (software development kit) versions, and demand stacks. A software development kit is typically a set of software development tools that allows the creation of applications for a certain software package, software framework, hardware platform, computer system, video game console, operating system, or similar development platform. An online dashboard in the interface provides mediation management and reporting features. Mobile SDKs provide a way to integrate mobile devices 112b with the ad-exchange platform 136.

Figure 2B:
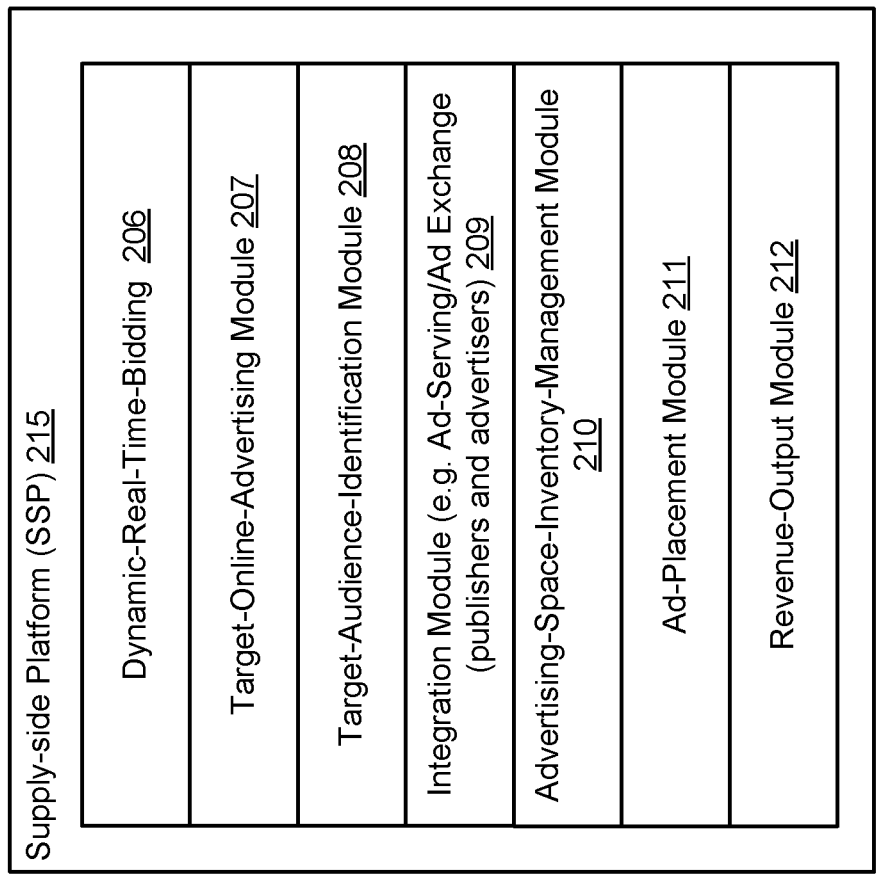
FIG. 2B is a block diagram illustrating an example Supply-Side Platform.
Figure 2A:
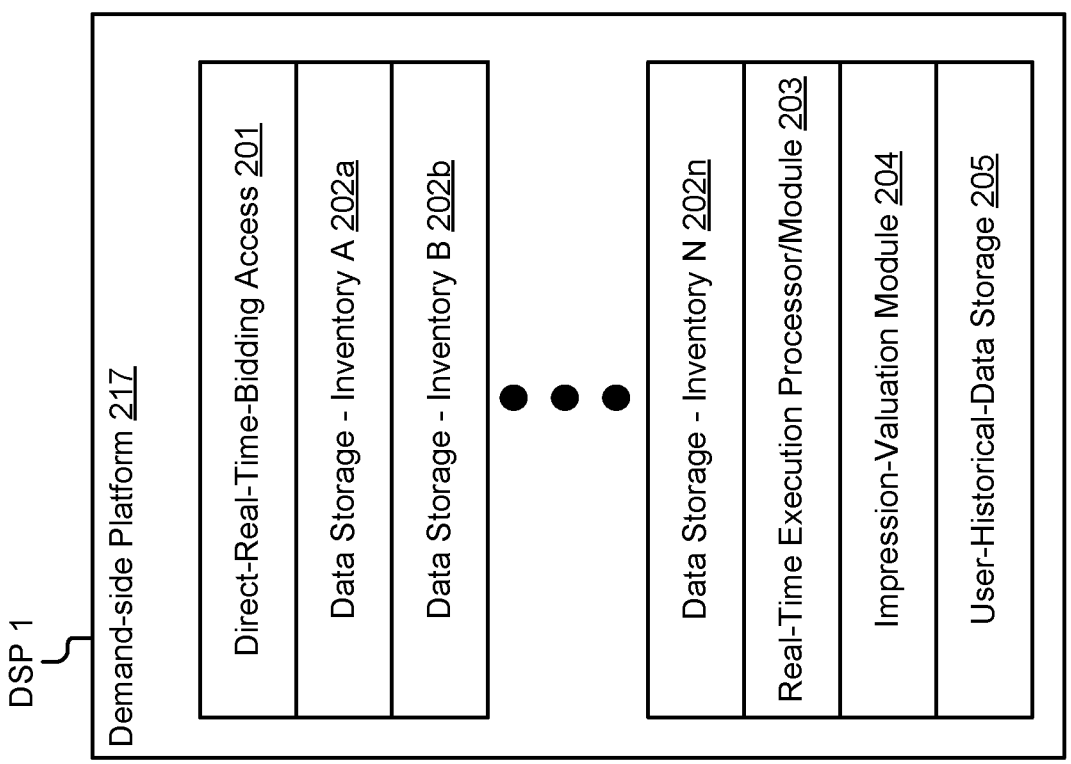
FIG. 2A is block diagram illustrating an example Demand-Side Platform.

Referring now to FIG. 2A, the demand-side platform DSP 1, referenced by numeral 217 is configured on a computer system with specialized software configured with algorithms to purchase advertising in an automated way. The demand-side platform 217 is used by advertisers and agencies to buy display, video, mobile, and search ads. The demand-side platform 217 permits advertisers to buy impressions across a range of publisher sites. The demand-side platform 217 includes a direct-real-time-bidding access module 201, which provides access to real-time bidding auction operations for determining pricing for the impressions. The demand-side platform 217 has wide access to inventory. This is illustrated by data storage with inventory (as illustrated by data inventory A, B, through N), where a first data storage 202a has inventory A of digital advertising, a data storage 202b has inventory B, and a data storage N has inventory N. The demand-side platform 217 includes a real-time execution processor or module 203, an impression-valuation module 204, and a user-historical-data storage 205. By the real-time execution processor or module 203, advertising is targeted to specific users based on information stored in the user-historical-data storage 205, such as user location and/or previous browsing behavior or other such criteria. When publishers make their ad impressions available, the demand-side platform 217 can automatically decide which of those impressions, for example, based on valuation by the impression-valuation module 204, an advertiser should purchase. The final price for each impression may be determined through the online bidding auction, access to which is provided by the direct-real-time-bidding access 201.

FIG. 2B illustrates an example supply-side platform (SSP) 215. The supply-side platform allows publishers to connect their inventory to multiple ad exchanges, demand-side platforms, and networks at once. This allows a wide range of potential buyers to purchase ad space and for publishers to receive the highest possible rates. With the supply-side platform, publishers can set price floors to set the minimum price. The supply-side platform 215 may include dynamic-real-time bidding 206 or provide a connection to it. It further includes target-online-advertising module 207, a target-audience-identification module 208, an integration module 209 to integrate with ad servers (e.g., agency ad server 133, ad-exchange platforms 136, and publishers and advertisers illustrated in FIG. 1). The supply-side platform 215 further includes an advertising-space-inventory-management module 210, an ad-placement module 211, and a revenue-output module 212. The target-online-advertising module 207 includes hardware and software configured to determine targets for particular advertising. The target-audience-identification module 208 includes hardware and software to identify specific audience segments, such as by age demographics, which may be defined in the data-management platform 138 (FIG. 1).

Figure 2C:
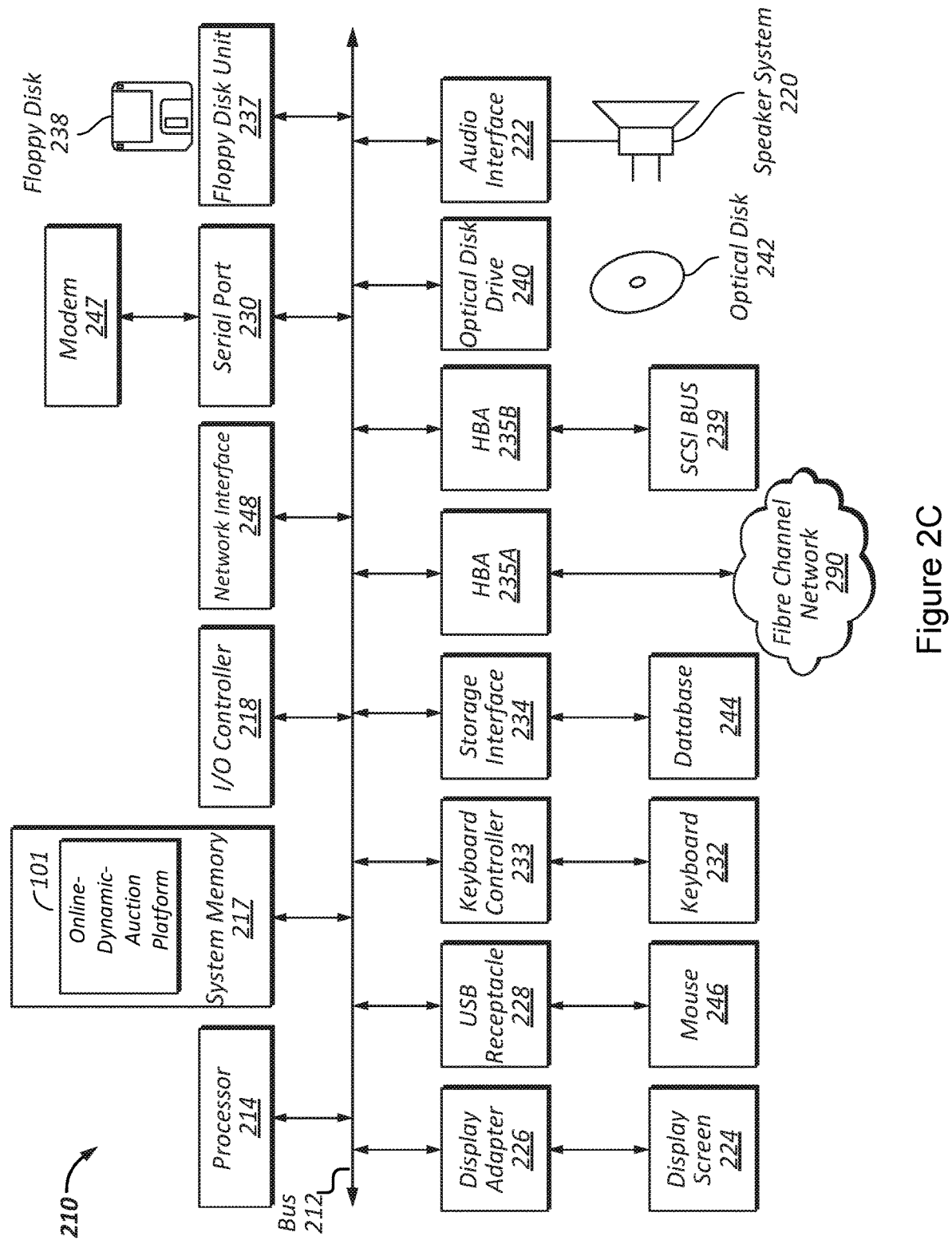
FIG. 2C is a block diagram of an example hardware configuration of an example Programmatic Ad-Exchange platform.

FIG. 2C is a block diagram of a computer system 210 suitable for implementing an example programmatic ad-exchange platform 101. It should be recognized that other servers/platforms (e.g., 115 and 117a-n) can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 228, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fiber Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 3B need not be present. The components can be interconnected in different ways from that shown in FIG. 2C.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2C, the online auction-platform is illustrated as residing in system memory 217. The workings of the online auction platform are explained in greater detail below in conjunction with FIGS. 3, 4 and 5.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
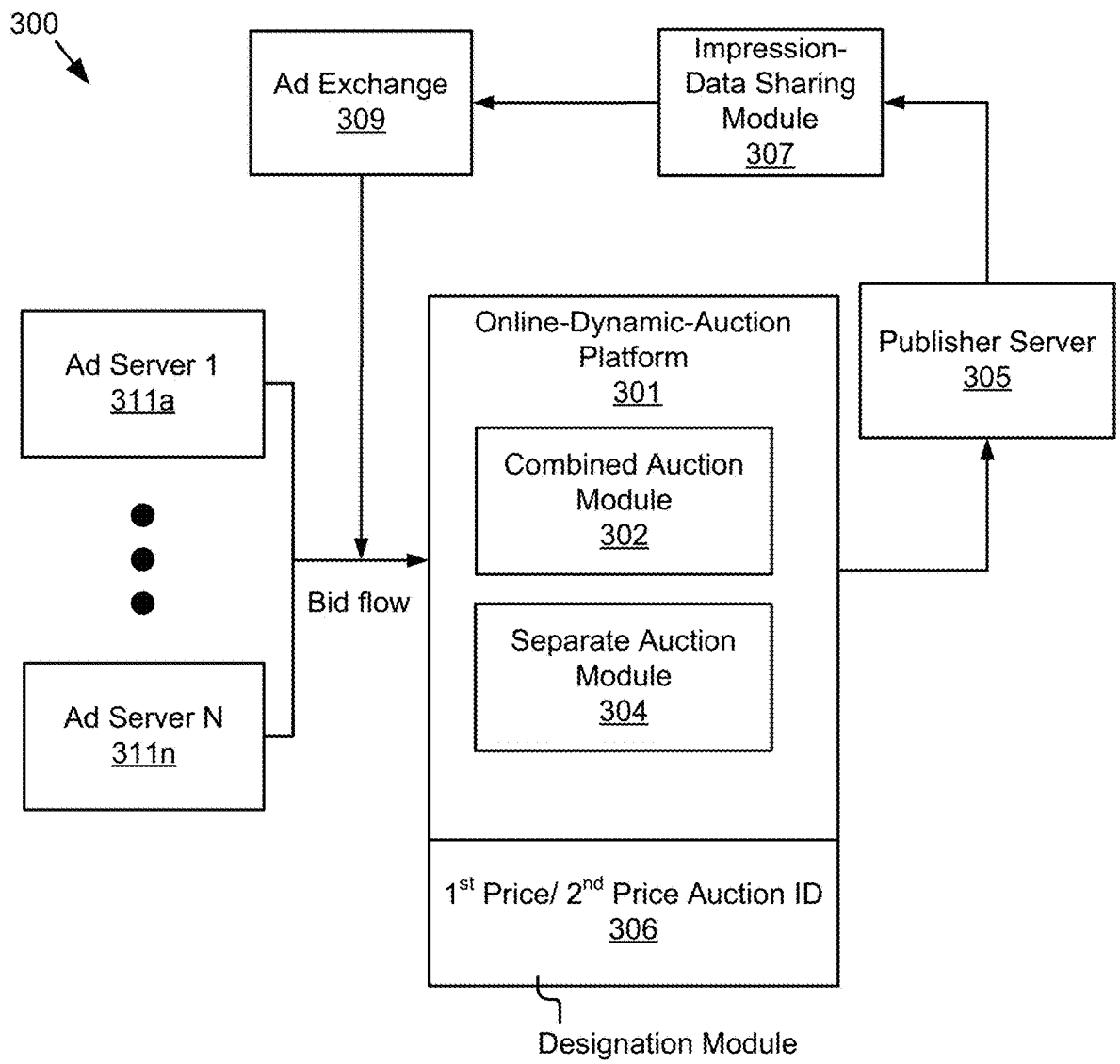
FIG. 3 is a block diagram illustrating an example online-dynamic-auction platform configured to conduct instantaneous separate and combined first and second price auctions, within the online digital advertising display environment.

Referring now to FIG. 3, in operation, a typical scenario with this technology begins with a user (see FIG. 1) visiting a website (see FIG. 1) over a communication network (see FIG. 1). This visit triggers a bid request that may comprise various pieces of data including but not limited to, a user's demographic information, browsing history, location, and the page being loaded, all of which may be provided by the impression-data sharing module 307. The request is subsequently routed over the network to the advertising-exchange platform 309, which submits the bid request and accompanying data to multiple advertisers (Ad Servers 1-N) who automatically submit bids in real time to place their ads. Advertisers bid on each ad impression as it is served, that is, on an impression-by-impression basis. The impression goes to the highest bidder and their ad is served on the page. This process is repeated for every ad slot (FIG. 1) on the page. Real-time bidding operations typically occur within 100 milliseconds from the moment the ad-exchange 309 receives the request. Further, in this scenario, demand-side platforms (DSPs in FIG. 1, also referred to as Demand Platforms, or Demand Partners) give buyers direct Real Time Bidding (RTB) access to multiple sources of inventory. Real Time Bidding is a means by which advertising inventory is bought or sold on a per-impression basis, via programmatic instantaneous auction, like the financial markets. DSPs typically are configured to streamline ad operations with applications that simplify the workflow and reporting operations. DSPs are directed at advertisers. It is a tool that automates the purchasing of online advertising on behalf of advertisers. Advertisers can use DSPs to set the buying parameters of their campaigns and to monitor campaign performance. In some implementations, the technology underlying the ad exchange can also provide the foundation for a DSP allowing for synergy between advertising campaigns. The DSP is configured with technology to determine the value of an individual impression in real time based upon what is known about a user's history. Supply-side platforms are used by large publishers, who manage multiple advertising networks. They can utilize data generated from impression-level bidding to help tailor advertising campaigns. In FIG. 3, the online-dynamic-auction platform 301 has a combined auction module or engine 302 and a separate auction module or engine 304 with a designation module for designating the different auction types, eg. $1^{st}$ price/$2^{nd}$ price auction ID 306.

In the online advertising landscape, the publisher provides the inventory. Before, real-time bidding was only used on the remnant inventory, however, it is increasingly used on premium inventory due to advertiser demand and the higher revenues it is yielding for publishers. Some publishers use SSPs to help better manage and sell their inventory.

The ad-exchange platform 309 includes a software/hardware tool that connects advertisers and publishers, facilitating the purchase of the display inventory in real-time through the different auction types. In this example, the $1^{st}$ and $2^{nd}$ price auctions take place in the milliseconds before the page loads. The $1^{st}$ and $2^{nd}$ price auctions may occur simultaneously or otherwise. It is through the $1^{st}$ and $2^{nd}$ price auctions that publishers can maximize the price for their inventory, while advertisers are able to purchase individual impressions at prices that reflect each impression's value to the campaign. In one example online advertising scenario, a 1st price auction may be implemented by which the bidder (e.g., an advertiser) who submits the highest bid and pays a price equal to the amount bid wins the object (e.g., individual impression). In the $1^{st}$ price auction, advertisers may be awarded slots in a priority order determined by their bids. For example, advertisers may be charged a price equal to the minimum of their bid and remaining budget, when budgets are assigned. In one example implementation of a $2^{nd}$ price auction, a user may perform a search, with the search engine displaying advertisements alongside the search results. These advertisements may appear in a dedicated area of the search results page (see FIG. 1), each one in a particular fixed subarea or slot. The online-dynamic auction is a mechanism for selling these slots based on the keyword, which the user provides to the search engine. Each advertiser submits a bid for each keyword representing the amount the advertiser is willing to pay for one impression in each slot. In some instances, advertisers may additionally submit a daily budget indicating the maximum amount they are willing to pay to spend in a given day. These parameters may be adjusted at predetermined times, for example daily, at the beginning of the day. Upon execution, the online advertising platform 300 selects a predetermined number of advertisers and assigns them slots. It then computes a price for each advertiser and typically guarantees that no bidder is charged more than his or her bid, nor exceeds his or her budget. Also, no bidder is awarded more than one slot per search query. In the $2^{nd}$ price auction mechanism, the allocation rule (who gets what) is identical to the $1^{st}$ price auction, but the pricing scheme is different. In a $2^{nd}$ price auction, the bidders are ordered by their bids and the top slot is given to the highest bidder, the second top slot to the second highest bidder and so on. In some instances, each advertiser may be charged a price equal to the minimum of his or her remaining budget and the bid of the advertiser in the next slot.

In some implementations, the publisher provides inventory to the ad exchange 309, which conducts the $1^{st}$ and $2^{nd}$ price auctions (either simultaneously or otherwise), during which the Demand Platforms (DSPs in FIG. 1), on behalf of the advertisers, can place a bid on each impression and on each auction type (e.g., $1^{st}$ or $2^{nd}$ auction type). A Demand Platform represents any platform/conduit (including other exchanges and networks), where advertisers (actual companies/brands) may use the Demand Platform to pass their value/bid into the ad exchange 309. The value of the bid in based on the value of the impression, as determined by the advertiser's parameters with the Demand Platform. The bidding process ensures that each impression is sold at the maximum price, as dictated by real time market demand. Once bidding is completed, the winner is chosen and the ad is served on the publisher's website. The real time bidding presents benefits for both buyers and sellers of online display advertising.

The advertising environment 300 includes: an advertiser server or site 311a-311n (representing one or more online advertisers Ad Server 1-Ad Server N), a publisher content server or site 305 (representing one or more online publishers), a network (e.g., an ad network), the ad-exchange platform 309 and user devices (including web browsers, see FIG. 1). The advertiser server 311a may be a computing system as described in FIG. 2c that submits requests to the ad-exchange platform 309 to purchase publisher inventory and have advertiser advertisements shown on the publisher's site 305. The publisher content server 305 may be a computing system as described in FIG. 2c that maintains online content that attracts users and contains placeholders for ads (inventory) that are submitted to the ad-exchange platform for sale to advertisers. The ad-exchange platform may be a computing system (see FIG. 2c) that aggregates inventory (e.g., premium inventory and remnant inventory) information from the publisher server 305 and provides the inventory information to the advertiser server 311a for advertisers to purchase impressions and/or inventories to post their advertisements. The advertiser server 311a is coupled to the ad-exchange platform 309 to provide advertisement content, advertising target information, price, or any other information related to the impression or necessary to serve the ad. The online publisher server 305 is a computing device for hosting a website with any type of content for publishing.

2. Process/Method Overview

Figure 4:
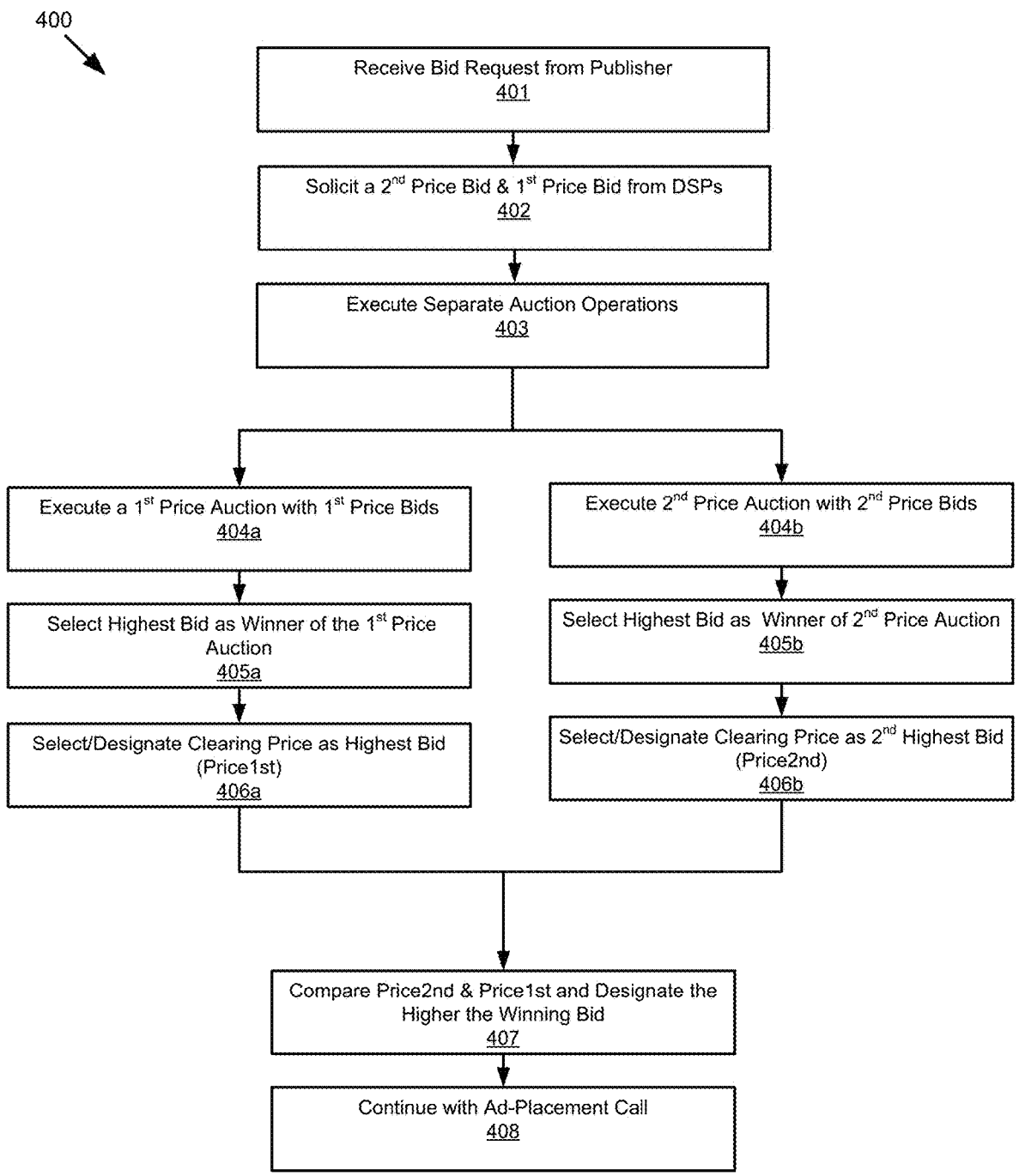
FIG. 4 is a block diagram illustrating a flow chart in accordance with one embodiment of the invention, of separate first and second price auctions instantaneously conducted on an impression-by-impression basis by the improved programmatic ad-exchange platform.

Referring now to FIG. 4, in accordance with one embodiment 400 where $1^{st}$ and $2^{nd}$ price auctions were chosen, separate auction may be conducted instantaneously (simultaneously, substantially simultaneously or otherwise). The process begins at block 401, which may include one or more operations for receiving a bid request from a publisher. The process 400 proceeds to the next block 402, which may include one or more operations for soliciting a $2^{nd}$ price bid and a $1^{st}$ price bid from a demand-side platform. The process 400 continues to the next block 403, including one or more operations for executing separate auctions. These separate auctions, although instantaneous, may be simultaneously, or offset by time (e.g., less than a millisecond). The process flows to block 404a (along one path), including one or more operations for executing a $1^{st}$ price auction with receiving $1^{st}$ price bids. The process 400 flows to block 404b (along another path), including one or more operations for executing a $2^{nd}$ price auction with receiving $2^{nd}$ price bids.

From block 404a, the process 400 flows to the next block 405a, including one or more operations for selecting a highest bid as the winner of the $1^{st}$ price auction. The process 4invn00 proceeds to the next block 406a, including one or more operations for selecting/designating a clearing price as the highest bid (price $1^{st}$), from where the process 400 proceeds to the next block 407. From block 404b, the process 400 flows to the next block 405b, including one or more operations for selecting a highest bid as the winner of the $2^{nd}$ price auction. The process 400 flows to the next block 406b, including one or more operations for selecting/designating a clearing price as the $2^{nd}$ highest bid (price $2^{nd}$), from where the process proceeds to the next block 407. At block 407, the process 400 continues with including one or more operations for comparing $2^{nd}$ price and $1^{st}$ price and designate the higher the winning bid. The process 400 continues to the next block 408, including one or more operations, for continuing with the ad-placement call.

Figure 5:
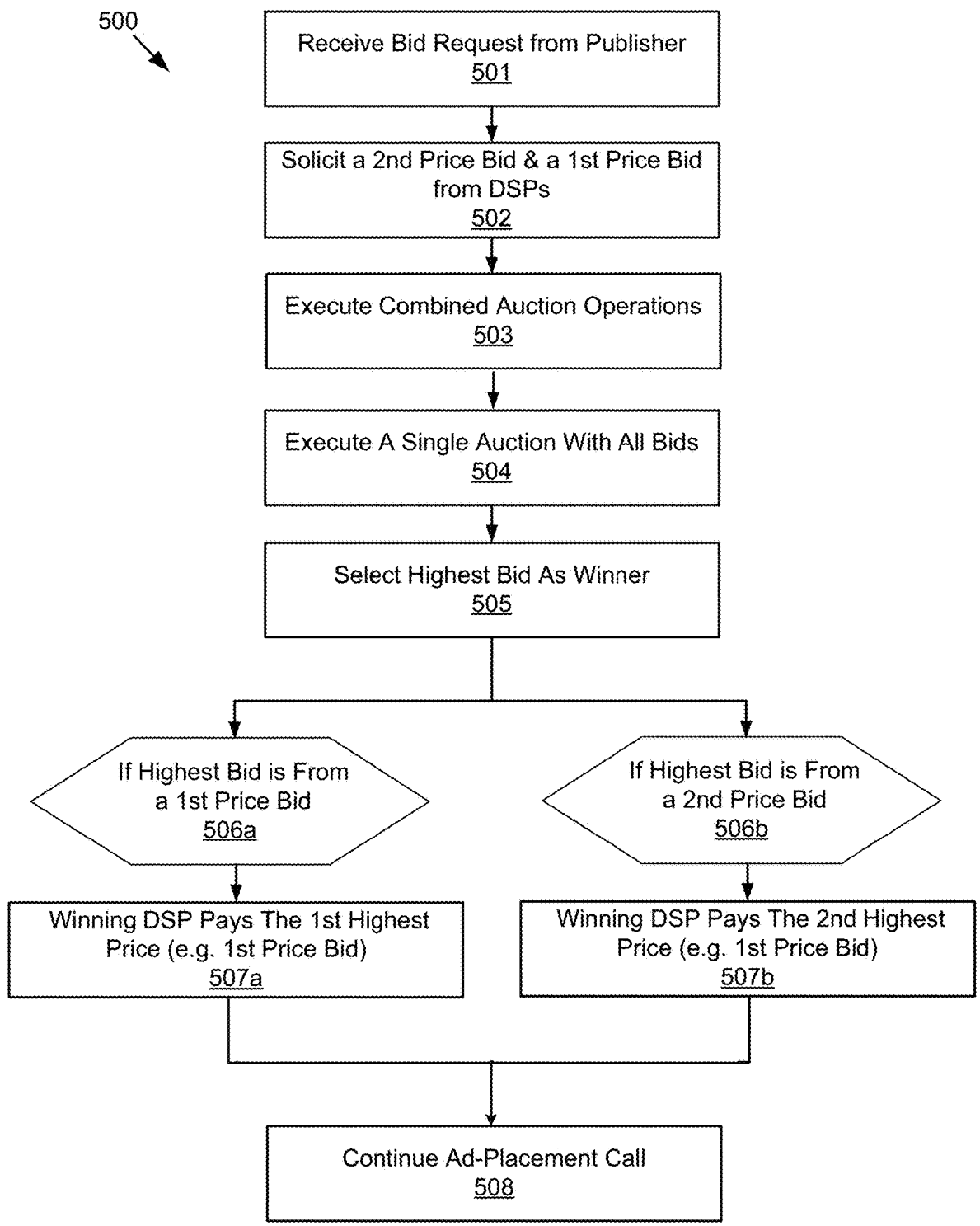
FIG. 5 is a block diagram illustrating a flow chart, in accordance with another embodiment of the invention, of combined first and second price auctions instantaneously conducted on an impression-by-impression basis by the improved programmatic ad-exchange platform.

Referring now to FIG. 5, in accordance with another embodiment 500, where $1^{st}$ and $2^{nd}$ price auctions were chosen, a combined auction may be conducted. The process 500 begin and proceeds to block 501, at which, one or more operations receive a bid request from a publisher. The process 500 proceeds to the next block 502, including one or more operations, by which, a $2^{nd}$ Price bid and a $1^{st}$ price bid are solicited from demand-side platforms. The process 500 proceeds to the next block 503, including one or more operations, for executing one or more combined auction operations. The process 500 proceeds to the next block 504, including one or more operations for, executing a single auction type with all bids. The process 500 proceeds to the next block 505, including one or more operations, by which a highest bid is selected as a winner. The process 500 proceeds along two different paths, the first, to a decision block 506a, and the second, to a decision block 506b. At decision block 506a, the process 500, determines if the highest bid is from a $1^{st}$ price bid. The process 500 continues to the next block 507a, including one or more operations for executing auctions by which the winning demand-supply platform (DSP) pays the $1^{st}$ highest price (e.g., $1^{st}$ price bid). The process 500 continues to the next block 508, including one or more operations, for continuing with the ad-placement call. At block 506b, the process 500 determines if the highest bid is from a $2^{nd}$ price bid. The process 500 continues to the next block 507b, including one or more operations, by which the winning DSP pays the $2^{nd}$ highest price (e.g. $1^{st}$ price bid). The process 500 continues to block 508, including one or more operations, for continuing the ad-placement call.

Figure 6:
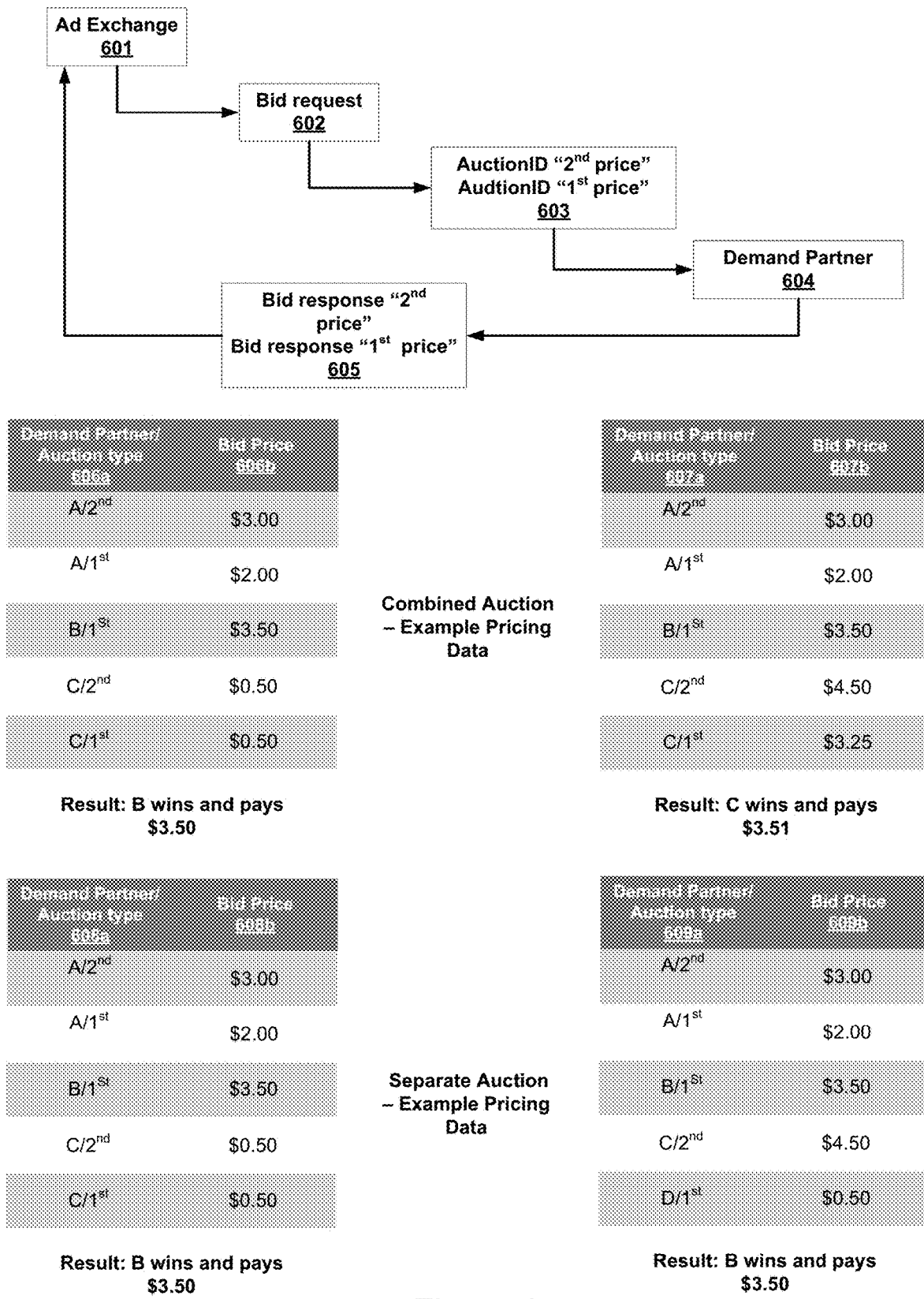
FIG. 6 is block diagram illustrating a high-level flow of operations in the first and second price auction processes with example data generated by the separate and combined embodiments.

Referring now to FIG. 6, the flow of a bid request 602 from the ad-exchange platform 601 is illustrated. The bid request 602 bears an AuctionID of a $2^{nd}$ price or a $1^{st}$ price, as illustrated at block 603. The bid request bearing an auction identification type is transmitted to one or more demand partners, as illustrated by block 604. The bid response from any or all of these demand partners 604 delineates a bid response from the $2^{nd}$ price auction type and a bid response from the $1^{st}$ price auction, as illustrated by block 605. The bid responses are transmitted back to the ad-exchange platform 601.

In one embodiment, the bid request 602 is configured with two separate auction identifiers (eg. $1^{st}$ price/$2^{nd}$ price auction ID) by the designation module 306, for example, "AuctionID $2^{nd}$ price" and "AuctionID $1^{st}$ price", which are routed to the Demand Partner 604 (also see FIGS. 1 and 2). The Demand Partner 604 generates two separate bid responses, indicated by Bid response "$2^{nd}$ price" and Bid response "$1^{st}$ price." Some example pricing variables for the combined auction and the separate auctions are illustrated in the two tables illustrated in FIG. 6. Alternatively, instead of the two auction identifiers, a single auction identifier may also be generated and used, with a $2^{nd}$ price and a $1^{st}$ price auction (either combined or separately) because in the end, there is only one winner of that auction.

It should be recognized that the system and processes described here may use other types of auctions, either separately or combined. Although the specification describes particular use of a $1^{st}$ price and $2^{nd}$ price auction, alternatively, a 3rd price auction type, a modified English auction or other auction types used in digital advertising display may be used.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment.

What is claimed is:

1. A programmatic method for digital advertising exchange comprising:

in an online ad-exchange platform, pairing one or more advertiser servers and one or more publisher servers over a network and rendering publisher content on a mobile client device via an application programming interface in real-time and displaying the publisher content and digital advertising on a web page, wherein the publisher content is displayed within a main area of the web page, and digital advertising filling vacant slots and advertising zones within the web page via a browser on the mobile client device, wherein the web page contains one or more URL links that cause the browser to request the digital advertising from the one or more advertiser servers to fill the vacant slots and advertising zones, the digital advertising provided based on a keyword provided by a user to a search engine when requesting the publisher content, said online ad-exchange platform including a processor, and executable code stored in a memory, wherein a bus links the processor and the memory, carrying and executing control actions including:

receiving, an ad tag in response to an ad request initiated by a snippet of HTML on the web page, and triggering real-time bidding, the ad tag comprising two separate identifiers triggering a first-price auction type operation and a second-price auction type operation, a designation module of the online ad-exchange platform further identifying a first auction identification type bearing one of a first-price auction and a second-type auction and a second auction identification type bearing another of the first-price auction and the second-type auction, and receiving dynamic impression data for filling the vacant slots and advertising zones with the digital advertising on the web page, selecting the digital advertising based on the keyword, and cookies identifying a user of the mobile client device;

transmitting, by the processor, the ad tag to the one or more advertiser servers paired to the online ad-exchange platform, and receiving multiple bid responses of both the first-price auction type and the second-price auction type from the one or more advertiser servers for the vacant slots;

determining, by the processor, a higher winner bid from the first-price auction type operation and the second-price auction type operation, and executing, by the processor, the first-price auction type with a first operation flow and the second-price auction type with a second operation flow in real-time, where the first operation flow and a second operation flow are separate operation flows that are initiated at the same time or a combined operation flow, the first operation flow executing the first-price auction with first-price bids and the second operation flow executing the second price auction with second-price bids, wherein during the first price auction, the higher winner bid is determined by:

selecting, by the processor, data representative of a highest bid as the winning bid of the first-price auction;

designating and selecting a highest bid as a winner of the second-price auction;

designating a first clearing price as the highest bid in the first-price auction and a second clearing price as a second-highest bid in the second-price auction, wherein in the first-price auction, the one or more advertiser servers are awarded the vacant slots and advertising zones in a priority order based on the keyword, and the cookies identifying the user; and comparing, by the processor, the first clearing price and the second clearing price and designating the higher winning bid between the first clearing price and the second clearing price before continuing with a call initiating filling of the vacant slots and advertising zones;

receiving, by the processor and the network, a particular advertisement associated with the higher winning bid received from the one or more advertiser servers; and displaying, by the processor via an ad tag script and in response to the keyword provided to the search engine executed by the application programming interface, the particular advertisement within one of the vacant slots and advertising zones, wherein the vacant slots and advertising zones are displayed besides the publisher content comprising of a plurality of search results.

2. The programmatic method of claim 1, wherein the cookies identifying a user of the mobile client device includes data from a user's history that is used to value each individual impression in real time.

3. The programmatic method of claim 1, further comprising additional demand partner platforms including at least one of a third-party exchange and an ad exchange, wherein an advertiser submits a daily budget limit indicative of a maximum amount the advertiser will spend in a given day.

4. A programmatic online ad-exchange platform for digital advertising, comprising:
a processor;
memory for executing instructions stored in the memory and adapted to cause the processor to execute interface actions;
an application programming interface executing the interface actions in real time over a network by pairing one or more advertiser servers and one or more publisher servers over the network and rendering publisher content on a mobile client device via an application programming interface in real-time and displaying the publisher content and digital advertising on a web page, wherein the publisher content is displayed within a main area of the web page, and the digital advertising filling vacant slots and advertising zones within the web page via a browser on the mobile client device, wherein the web page contains one or more URL links that cause the browser to request the digital advertising from the one or more advertiser servers to fill the vacant slots and advertising zones, the digital advertising provided based on a keyword provided by a user to a search engine when requesting the publisher content, said online ad-exchange platform including a processor, and executable code stored in a memory, wherein a bus links the processor and the memory, carrying and executing control actions, including:

receive an ad tag in response to an ad request initiated via a snippet of HTML on the web page, and triggering real-time bidding, the ad tag comprising two separate identifiers triggering a first-price auction type operation and a second-price auction type operation, a designation module of the online ad-exchange platform further identifying a first auction identification type bearing one of a first-price auction and a second-type auction and a second auction identification type bearing another of the first-price auction and the second-price auction, and receive dynamic impression data for filling the vacant slots and advertising zones with the digital advertising on the web page, and selecting the digital advertising based on the keyword, and cookies identifying a user of the mobile client device;

transmit the ad tag to the one or more advertiser servers paired to the online ad-exchange platform and receive multiple bid responses of both the first-price auction type and the second-price auction type from the one or more advertiser servers for the vacant slots;

determine a higher winner bid from the first-price auction type operation and the second-price auction type operation, and executing, by the processor, the first-price auction type with a first operation flow and the second-price auction type with a second operation flow in real-time, where the first operation flow and a second operation flow are separate operation flows that are initiated at the same time or a combined operation flow, the first operation flow executing the first-price auction with first-price bids and the second operation flow executing the second price auction with second-price bids, wherein during the first price auction, the higher winner bid is determined by:

select data representative of a highest bid as the winning bid of the first-price auction;

designate and select the highest bid as the winner of the second-price auction;

designate a first clearing price as the highest bid in the first-price auction and a second clearing price as a second-highest bid in the second-price auction, wherein in the first-price auction, the one or more advertiser servers are awarded the vacant slots and advertising zones in a priority order based on the keyword, and the cookies identifying the user;

compare the first clearing price and the second clearing price and designate the higher winning bid between the first clearing price and the second clearing price before continuing with a call initiating filling of the vacant slots and advertising zones;

receive a particular advertisement associated with the higher winning bid received from the advertisement server; and display via an ad tag script and in response to the keyword provided to the search engine executed by the application programming interface, the particular advertisement within one of the vacant slots and advertising zones, wherein the vacant slots and advertising zones are displayed besides the publisher content comprising of a plurality of search results.

5. The programmatic online ad-exchange platform of claim 4, wherein the cookies identifying a user of the client device includes data from a user's history that is used to value each individual impression in real time.

6. The programmatic online ad-exchange platform of claim 5, connected to one or more additional demand partner platforms via the network, wherein the demand partner platforms include at least one of a third-party exchange and an ad exchange, wherein an advertiser submits a daily budget indicative of a maximum amount the advertiser will spend in a given day.

7. The programmatic online ad-exchange platform of claim 5, wherein a bid response from one or more additional demand partners carries an identification of the auction type.

8. A non-transitory computer program product implemented by a programmatic online ad-exchange platform, connected by a network, to a plurality of mobile client devices, comprising:

in an online ad-exchange platform, pairing one or more advertiser servers and one or more publisher servers over a network and rendering publisher content on a mobile client device via an application programming interface in real-time and displaying the publisher content and digital advertising on a web page, wherein the publisher content is displayed within a main area of the web page, and digital advertising filling vacant slots and advertising zones within the web page via a browser on the client device, wherein the web page contains one or more URL links that cause the browser to request the digital advertising from the one or more advertiser servers to fill the vacant slots and advertising zones, the digital advertising provided based on a keyword provided by a user to a search engine when requesting the publisher content, said online ad-exchange platform including a processor, and executable code stored in a memory, wherein a bus links the processor and the memory, carrying and executing control actions, further comprising:

means for receiving an ad tag by a processor, in response to an ad request initiated by a snippet of HTML on the web page, and triggering real-time bidding, the ad tag comprising two separate identifiers triggering a first-price auction type operation and a second-price auction type operation, a designation module of the online ad-exchange platform further identifying a first auction identification type bearing one of a first-price auction and a second-type auction and a second auction identification type bearing another of the first-price auction and the second-type auction, and receiving dynamic impression data for filling the vacant slots and advertising zones with digital advertising on the web page, selecting the digital advertising based on a keyword, and cookies identifying a user of the client device;

means for transmitting the ad tag to the one or more advertiser servers paired to the online ad-exchange platform, and receiving multiple bid responses of both the first-price auction type and the second-price auction type from one or more advertiser servers for the vacant slots;

means for determining, by the processor, a higher winner bid from the first-price auction type operation and the second-price auction type operation, and executing, by the processor, the first-price auction type with a first operation flow and the second-price auction type with a second operation flow in real time, where the first operation flow and the second operation flow are separate operation flows that are initiated at the same time or in a combined operation flow, the first operation flow executing the first-price auction with first-price bids and the second operation flow executing the second-price auction with second-price bids, wherein during the first-price auction the higher winner bid is determined by;

means for selecting by the processor, data representative of a highest bid as the winning bid of the first-price auction;

designating and selecting a highest bid as a winner of the second-price auction;

designating a first clearing price as the highest bid in the first-price auction and a second clearing price as a second-highest bid in the second-price auction, wherein in the first-price auction, the one or more advertiser servers are awarded the vacant slots and the advertising zones in a priority order based on the keyword, and the cookies identifying the user;

means for comparing by the processor, the first clearing price and the second clearing price and designating the higher winning bid between the first clearing price and the second clearing price before continuing with a call initiating filling of the vacant slots and advertising zones;

means for receiving by the processor, via an ad tag script and in response to the keyword provided to a search engine executed by an application programming interface, the particular advertisement associated with the higher winning bid received from the one or more advertiser servers; and means for displaying by the processor, via an ad tag script and in response to the keyword provided to the search engine executed by the application programming interface, particular advertisement within one or more of the vacant slots and advertising zones, wherein the vacant slots and the advertising zones are displayed besides publisher content comprising of a plurality of search results.

9. The non-transitory computer program product of claim 8, wherein the cookies identifying a user of the mobile client device includes data from a user's history that is used to value each individual impression in real time.

10. The non-transitory computer program product of claim 9, connected to one or more additional demand partner platforms via the network, wherein the additional demand partner platforms include at least one of a third-party exchange and an ad exchange, wherein an advertiser submits a daily budget indicative of a maximum amount the advertiser will spend in a given day.

* * * * *